Dec. 30, 1930.  C. DUPUIS  1,787,341

WHITE WATER SYSTEM FOR RECLAIMING WHITE WATER OR ANY FIBER

Filed Sept. 4, 1929  3 Sheets-Sheet 1

Inventor
Charles Dupuis

By Clarence A. O'Brien
Attorney

Dec. 30, 1930.  C. DUPUIS  1,787,341
WHITE WATER SYSTEM FOR RECLAIMING WHITE WATER OR ANY FIBER
Filed Sept. 4, 1929  3 Sheets-Sheet 3

Inventor
Charles Dupuis

By Clarence A. O'Brien
Attorney

Patented Dec. 30, 1930

1,787,341

UNITED STATES PATENT OFFICE

CHARLES DUPUIS, OF LADYSMITH, WISCONSIN

WHITE-WATER SYSTEM FOR RECLAIMING WHITE WATER OR ANY FIBER

Application filed September 4, 1929. Serial No. 390,291.

This invention relates to a settling system and is particularly adapted to paper-making machines.

An object of the invention is to provide for an economical concentration of the heavier constituents of waste water from paper machines, such as sizing, alum, clay, color and paper pulp, on the one hand, and the recovery of the clear water resulting from the settling system on the other hand.

Another feature of the invention is the conservation of clear water that does not require heating in the wintertime and in the summertime will keep the water cool to avoid pitch that occurs if the water is too hot.

A further feature of the present invention provides an underfed settling system that utilizes the weight of the water to cause the pulp to settle to the bottom of the tanks and thereby eliminates the use of a mordant to hasten the settling, and furthermore to provide for selectively cutting the battery of settling tanks out of operation to eliminate waste in event of shut-downs and also to permit quick change from one color of paper to another.

Further objects of the invention are to provide a settling system of the character referred to, which is very simple in its assembly, thoroughly reliable for its intended purpose, compact in arrangement and comparatively inexpensive to install.

With the foregoing and other objects in view, the invention consists in the novel construction, combination and arrangements of parts as will be hereinafter more specifically described and illustrated in the accompanying drawings, wherein is disclosed an embodiment of the invention, but it is to be understood that changes, variations and modifications may be resorted to without departing from the spirit of the claims hereto appended.

In the drawings wherein like reference characters denote corresponding parts throughout the several views.

Figure 1:
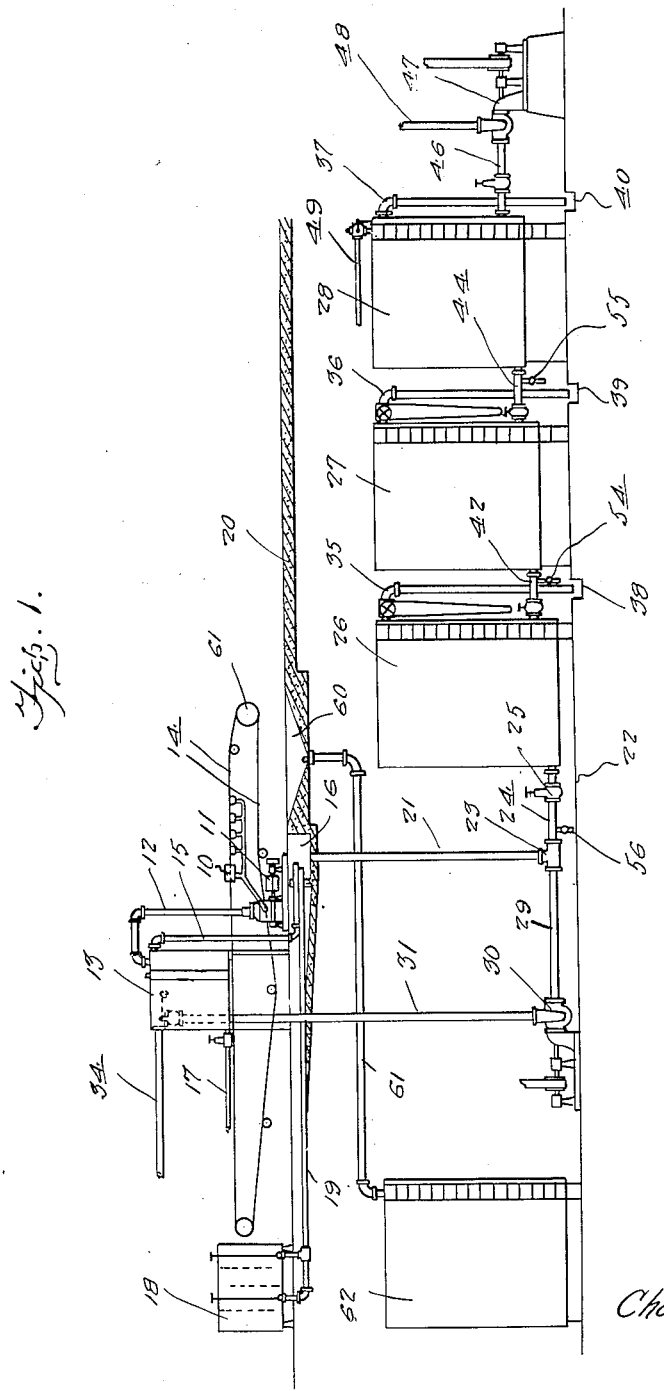
Figure 1 is a side elevation of the system in accordance with the present invention.
Figure 2:
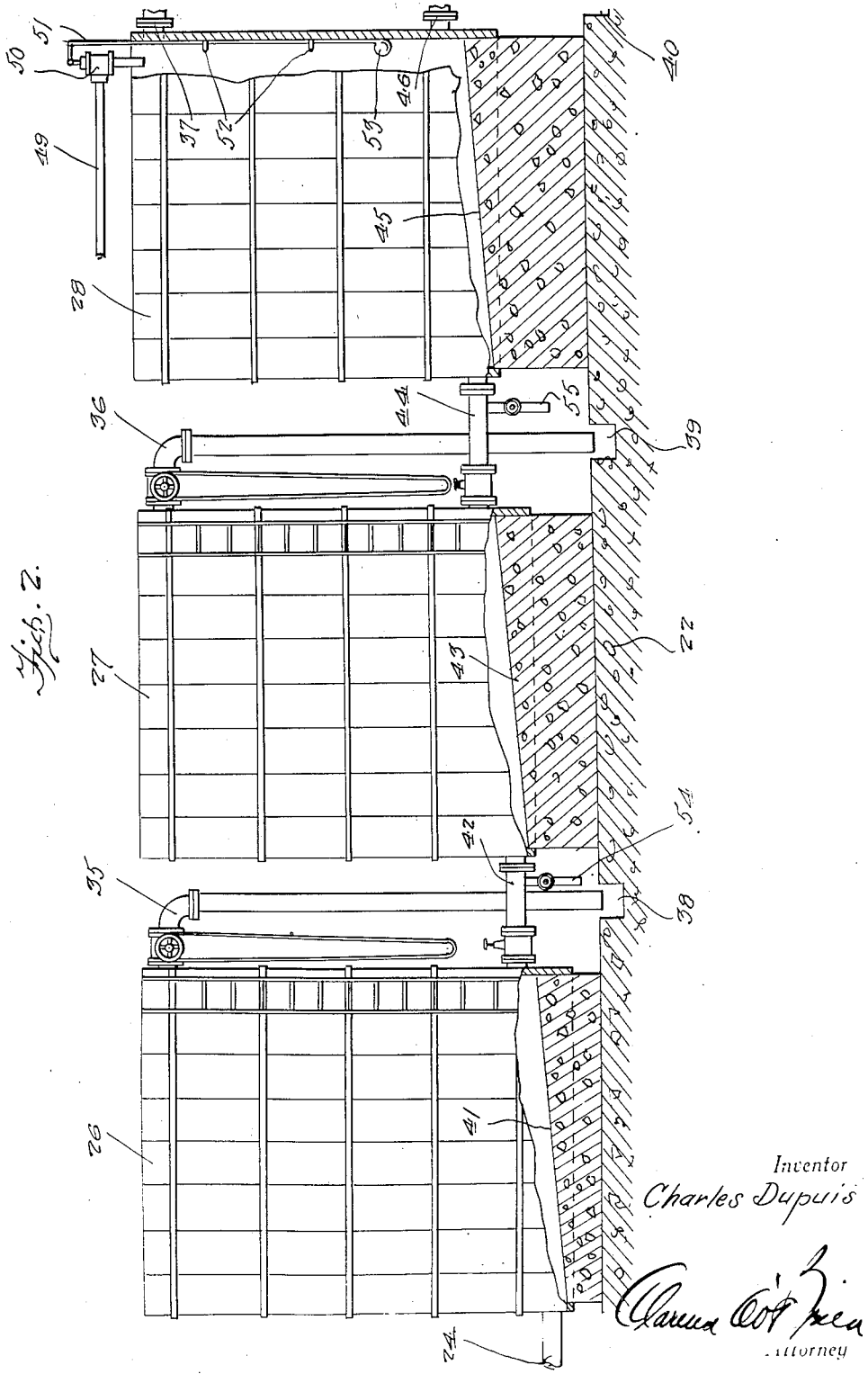
Figure 2 is an enlarged sectional view through the foundation showing the battery of settling tanks in side elevation and partly broken away supported thereon in accordance with the present invention.
Figure 3:
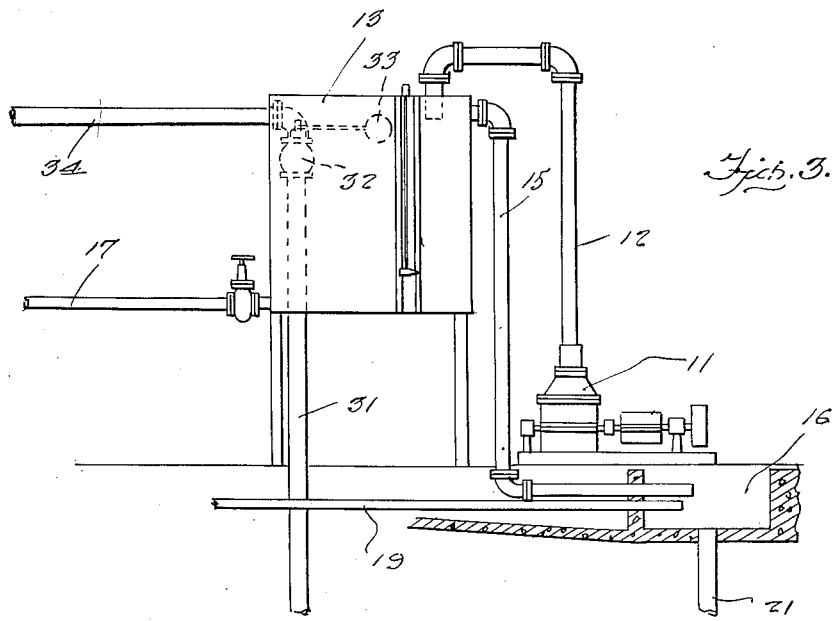
Figure 3 is an enlarged portion of the system showing the suction box of the paper machine and the white water tank in side elevation and furthermore showing a section through the recovery pit.
Figure 4:
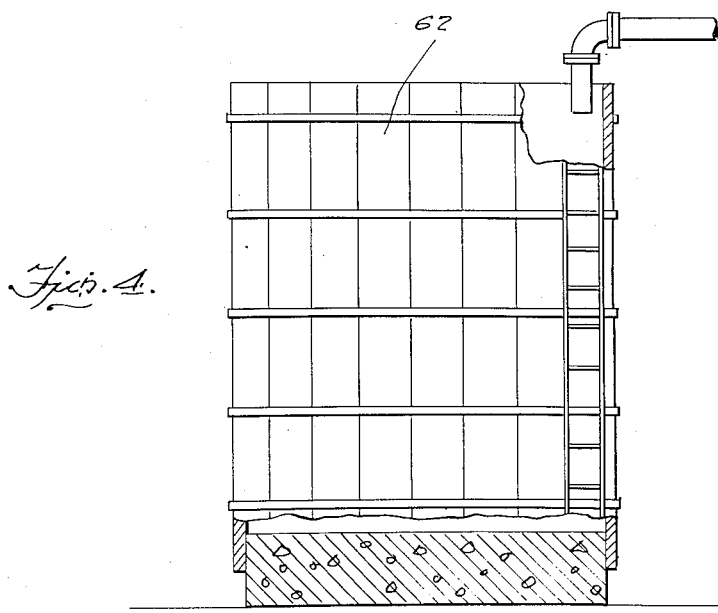
Figure 4 is a side elevation partly broken away of the machine chest tank.

Referring to the drawings in detail, 10 indicates the suction box on the conventional Fourdrinier paper making machine that is connected with a suction pump 11. The suction pump 11 carries excess water containing pulp, color and other chemicals from the suction box 10 through the conductor pipe 12 connected to the suction box and empties the same into the white water tank 13. The suction box 10 as adapted to the conventional paper machine is utilized to draw the excess water from the pulp carried on the carrier wire 14 as it passes over the suction box.

The white water receiving tank 13 is of any preferred shape and may be changed according to the size of the paper machine used. It will be seen that the white water receiving tank 13 contains the richest of the discharge water. An overflow pipe 15 leads from the upper end of the tank 13 and discharges into the discharge pit 16. A valve controlled pipe line 17 leads from the bottom of the receiving tank 13 and discharges into the paper machine fan pump.

It therefore follows that the pulp and heavier constituents will be carried directly back to the paper machine fan pump where the water and fiber are mixed, for supplying the paper pulp to the paper machine.

A tank 18 is known as the paper machine head box and leading therefrom is a conductor pipe 19 that also empties into the drain pit 16. When operating the paper machine this box is full of paper stock of proper consistency for making the paper. By having the outlet pipe 19 emptying into the discharge pit 16 all rich fiber from the head box drains to the discharge pit when shutting down the machine so that none of the ingredients in the water will be wasted.

In most of the arrangements, the water from the head boxes are drained into sewers and wasted. All of the foregoing construction described is supported substantially on the same level and the pit 16 may be countersunk as desired below the floor level 20. A vertically extending drain pipe 21 extends into the basement level 22 and at its lower end is provided with a T connection 23. Connected to one side of the T connection 23 is a drain pipe 24 having a valve 25 thereon. The conductor 24 leads into the bottom of the first of a series of alined interconnected settling tanks, 26, 27, and 28, to be described in detail later.

To the other end of the T-shaped fitting 23 is connected a conductor pipe 29 that is operatively connected with a pump 30. Leading from the pump 30 in a vertical direction is a pipe line 31 that extends through the bottom of the receiving tank 13 on the floor level above. The upper end of the pipe 31 and interiorly of the tank 13 is provided with a float valve 32 having a float 33 rockably connected thereto. Also connected to the upper end of the pipe 31 and adjacent the float valve 32 is a conductor pipe 34 that leads to the beaters or the pulp mill.

The pump 30 is operating continuously, and the capacity thereof is such that there is enough water to supply the demands of the receiving tank and at the same time to provide the beaters with water through the pipe 34.

By connecting pump 30 next to the stock tight line 21, the suction from the pump 30 and the pressure head of the stock line 21 will prevent fibers, chemicals, or fillers from escaping into the settling tanks. In arranging the pump in this way, the water richest in fiber is next to the pump with the lighter white water from the settling tanks behind the stop line 21.

The battery of settling tanks 26, 27, and 28 are preferably cylindrical in shape but may be of any configuration. The settling tanks 26, 27 and 28 have their open tops disposed in the same horizontal plane as will be clearly understood by referring to the drawings and leading from the top of each tank 26 and 27 is a valve controlled overflow pipe 35, 36, while on the last of the series of tanks 28 there is an overflow pipe 37 that is open at all times.

The ends of the overflow pipes 35, 36, and 37, leading from the respective tanks 26, 27 and 28 flow into the respective gutters 38, 39 and 40 to conduct the overflow waters therefrom to the sewers. The bottom 41 of the forward tank 26 of the series inclines upwardly from the inlet of conductor pipe 24 to the diametrically opposite sides where a valve controlled conductor pipe 42 connects with the next settling tank 27. The bottom 43 of the next settling tank 27 of the series inclines upwardly from the mouth of the conductor pipe 42 in the same plane of inclination and in the same degree as the bottom 41 of the settling tank 26 which is the first in line.

Adjacent the point of highest inclination of the bottom 43 there is a valve controlled conductor pipe 44 that connects with the bottom of the last of the settling tanks 28. The bottom 45 of the last of the settling tanks 28 inclines from the inlet conductor 44 to the diametrically opposite side of the tank where a valve controlled outlet conductor 46 leads therefrom. The inclination of the bottom 45 of the last settling tank 28 extends in the same plane as the bottoms 41, 43 of the settling tanks 26, 27, whereby a continuous inclination in the same plane is provided from the last settling tank 28 to the first settling tank 26 and the respective conductor pipes 42 and 44 connects the lowest point of the one tank with the highest point of the adjacent tank having reference to the inclination of the bottoms thereof.

The valve controlled outlet conductor 46 is connected to a pump 47 that carries the substantially clear water found in the settling tank 28 to the conductor pipe 48 for supplying clear water to the showers and priming the line for dissolving alum and for squirting down saveall under the wire on the paper making machine. The last of the series of tanks 28 has connected thereto a fresh water supply pipe line 49 that supplies fresh water through the valve 50 that is controlled by a rod 51 extending through the pair of staples 52 in the walls of the tank.

On the lower end of the rod 51 is a float 53 that is so arranged that it causes the rod 51 to open the valve 50 when the water in the last tank 28 falls below the level of two feet, whereby fresh water is admitted to the series of settling tanks. A separate valve controlled outlet pipe 55 is connected with the respective conductor pipes 42 and 44 so that either of the settling tanks 26, 27 or 28 may be drained in event it is necessary to repair the same or to clean the tanks.

There is a valve controlled drain pipe 56 on the conductor 24 between the T-shaped union and the valve 25.

In the application of the present invention, the excess water from the suction box is all carried into the white water receiving tank 13; while the paper machine is operating there is ordinarily enough water to keep the receiving tank 13 full and consequently there will be enough water flowing through outlet 17 to the fan pump to supply the necessary amount for mixing with fresh pulp therein. If there is an over-supply in the receiving tank 13, it finds an outlet into the discharge pit 16 through the conductor pipe 15.

The float valve 32 is arranged so that it will only supply white water when the tank is not discharging through the outlet pipe 15. It therefore follows that the water passing through conductor 31 will always find an outlet through pipe 34 to the beaters or pulp mill. The overflow, which under normal conditions of operation carries water to the discharge pit 15 is conducted through the drain pipe 21.

The pump 47 and the pump 30 are drawing water from the series of settling tanks 26, 27 and 28 in opposite directions. The pump 47 being arranged at the highest point in the system will obviously carry off the supernatant liquid whereas the pump 30 will carry the water rich in sediment such as pulp, clay and the like upwardly into the white water receiving tank 13 and if this tank has its full supply, will by-pass the water through conductor 34 to the beaters. It will be noted that the conductor 24, the conductor 42 and the conductor 44 are located at the lowest points of the respective tanks 26, 27 and 28 so that the heavily pulp laden water will be entering at the lowest points of the tank having the weight of the water thereabove to aid in settling the sediment on the inclined bottoms of the settling tanks.

The bottoms of the respective tanks form a continuous inclined plane from the first tank 26 to the last tank 28 of the series so that the pulp will have a tendency to accumulate at the lowest point of the first tank 26 ready to be pumped therefrom by the action of the pump 30. In event it becomes necessary to repair the machine in any way, the valve 25 may be closed so as to conserve the pulp and water contained in the series of settling tanks.

Furthermore, in event it be desired to clean any particular settling tank, it may be closed off without interferring with the other tanks. By the time the water has reached the last settling tank 28 of the series it is usually clear and is conditioned to be utilized in the sprays or other parts of the paper mill that require clear water.

The valve 25 is placed in its position in event the pump 30 breaks down. The valve could be closed and necessary repairs done without wasting water. The valve is also utilized in event that the head box 18 and pit 16 should need cleaning whereupon the valve can be closed and the drain opened allowing the cleaning of both the headbox and the pit without wasting richly laden fiber water.

A pit 60 is provided under the couch roll 61 of the wire carrier 14 and leading therefrom is a conductor pipe 61 that empties into the machine chest 62 for conducting excess stock thereto.

It is to be understood that by describing in detail herein any particular form, structure or arrangement, it is not intended to limit the invention beyond the terms of the several claims or the requirements of the prior art.

Having described my invention, what I claim is:

1. A settling system for paper machines comprising a white water receiving tank adapted for supplying water to the fan pump of a paper machine, a suction box pump adapted for conducting excess water from the paper machine, a conductor pipe connecting the suction box with the white water receiving tank, a drain pit on substanially the same level as the white water receiving tank and the suction box and having a drain pipe leading therefrom, a pump operatively connected with one side of the drain pipe and having an automatically controlled outlet discharging into the white water receiving tank, a series of settling tanks selectively connected together at their bottoms, the forward tank of the series being selectively connected with the other side of the drain pipe, overflow means on each tank, a pump operatively connected with the bottom of the last tank of the series for carrying off supernatant water, and automatic means on the last tank for admitting fresh water when the water in the settling tanks reaches a predetermined point.

2. A settling system for paper machines comprising a white water receiving tank adapted for supplying water to the fan pump of a paper machine, a suction box pump adapted for conducting excess water from the paper machine, a conductor pipe connecting the suction box with the white water receiving tank, a drain pit on substantially the same level as the white water receiving tank and the suction box and having a drain pipe leading therefrom, a pump operatively connected with one side of the drain pipe and having an automatically controlled outlet discharging into the white water receiving tank, a series of settling tanks selectively connected together at their bottoms, the forward tank of the series being selectively connected with the other side of the drain pipe, overflow means on each tank, a pump operatively connected with the bottom of the last tank of the series for carrying off supernatant water, and automatic means on the last tank for admitting fresh water when the water in the settling tank reaches a predetermined point, said pump and series of settling tanks on a level below the drain pit.

3. A settling system for paper machines comprising a white water receiving tank adapted for supplying water to the fan pump of a paper machine, a suction box pump adapted for conducting excess water from the paper machine, a conductor pipe connecting the suction box with the white water receiving tank, a drain pit on substantially the same level as the white water receiving tank and the suction box and having a drain pipe leading therefrom, a pump operatively connected with one side of the drain pipe and having an automatically controlled outlet discharging into the white water receiving tank, a series of settling tanks selectively connected together at their bottoms, the forward tank of the series being selectively connected with the other side of the drain pipe, overflow means on each tank, a pump operatively connected with the bottom of the last tank of the series for carrying off supernatant water, and automatic means on the last tank for admitting fresh water when the water in the settling tank reaches a predetermined point, said pump and series of settling tanks on a level below the drain pit, the bottoms of the settling tanks inclining in the same plane to form a continuous slope from the outer to the inner of the series.

4. A settling system for paper machines comprising a white water receiving tank adapted for supplying water to the fan pump of a paper machine, a suction box pump adapted for conducting excess water from the paper machine, a conductor pipe connecting the suction box with the white water receiving tank, a drain pit on substantially the same level as the white water receiving tank and the suction box and having a drain pipe leading therefrom, a pump operatively connected with one side of the drain pipe and having an automatically controlled outlet discharging into the white water receiving tank, a series of settling tanks selectively connected together at their bottoms, the forward tank of the series being selectively connected with the other side of the drain pipe, overflow means on each tank, a pump operatively connected with the bottom of the last tank of the series for carrying off supernatant water, and automatic means on the last tank for admitting fresh water when the water in the settling tank reaches a predetermined point, said pump and series of settling tanks on a level below the drain pit, the bottoms of the settling tanks inclining in the same plane to form a continuous slope from the outer to the inner of the series, and the selective controlled connection between the series of settling tanks connecting the lowest point of the bottom of the farthermost tank of the series to the highest point of the inner adjacent settling tank.

5. In combination with a white water receiving tank of a paper making machine, a drain pit adapted for receiving excess water from the tank, a series of selectively interconnected settling tanks, a conductor pipe leading from the drain pit and selectively connected with the first of the series of tanks at the bottom thereof, said selective interconnections between the series of tanks being at their bottoms, independent means on each tank to conduct overflow therefrom and means connected at the bottom of the first and last tank of each series for drawing the contents therefrom, and an automatic valve on the last tank of the series for supplying fresh water.

6. In combination with a white water receiving tank of a paper making machine, a drain pit adapted for receiving excess water from the tank, a series of selectively interconnected settling tanks, a conductor pipe leading from the drain pit and selectively connected with the first of the series of tanks at the bottom thereof, said selective interconnections between the series of tanks being at their bottoms, independent means on each tank to conduct overflow therefrom and means connected at the bottom of the first and last tank of each series for drawing the contents therefrom, and an automatic valve on the last tank of the series for supplying fresh water, said last mentioned means withdrawing the contents from the series in opposite directions and simultaneously.

7. In combination with a white water receiving tank of a paper making machine, a drain pit adapted for receiving excess water from the tank, a series of selectively interconnected settling tanks, a conductor pipe leading from the drain pit and selectively connected with the first of the series of tanks at the bottom thereof, said selective interconnections between the series of tanks being at their bottoms, independent means on each tank to conduct overflow therefrom and means connected at the bottom of the first and last tank of each series for drawing the contents therefrom, and an automatic valve on the last tank of the series for supplying fresh water, said last mentioned means withdrawing the contents from the series in opposite directions and simultaneously, the bottom of each tank in the series inclining in a continuous plane from the innermost to the outermost tank of the series.

8. In combination with a white water receiving tank of a paper making machine, a drain pit adapted for receiving excess water from the tank, a series of selectively interconnected settling tanks, a conductor pipe leading from the drain pit and selectively connected with the first of the series of tanks at the bottom thereof, said selective interconnections between the series of tanks being at their bottoms, independent means on each tank to conduct overflow therefrom and means connected at the bottom of the first and last tank of each series for drawing the contents therefrom, and an automatic valve on the last tank of the series for supplying fresh water, said last mentioned means withdrawing the contents from the series in opposite directions and simultaneously, the bottom of each tank in the series inclining in a continuous plane from the innermost to the tive interconnecting means between each tank located between the lowest point of the outer tanks with the highest point of the adjacent inner tank.

9. In combination with a white water receiving tank of a paper making machine, a drain pit adapted for receiving excess water from the tank, a series of selectively interconnected settling tanks, a conductor pipe leading from the drain pit and selectively connected with the first of the series of tanks at the bottom thereof, said selective interconnections between the series of tanks being at their bottoms, independent means on each tank to conduct overflow therefrom and means connected at the bottom of the first and last tank of each series for drawing the contents therefrom, and an automatic valve on the last tank of the series for supplying fresh water, said last mentioned means withdrawing the contents from the series in opposite directions and simultaneously, the bottom of each tank in the series inclining in a continuous plane from the innermost to the outermost tank of the series, and the selective interconnecting means between each tank located between the lowest point of the outer tanks with the highest point of the adjacent inner tank and said last mentioned means for withdrawing the contents located at the lowest point on the innermost tank and the highest point on the outermost tank.

10. A settling system for paper machines comprising a white water receiving tank adapted for supplying water to the fan pump of a paper machine, a suction box pump adapted for conducting excess water from the paper machine, a conductor pipe connecting the suction box with the white water receiving tank, means for carrying away excess water from the suction box and the white water receiving tank, a pump operatively connected to one side of said means and discharging into said white water receiving tank, and a settling tank operatively connected to another side of said means.

11. A settling system for paper machines comprising a white water receiving tank adapted for supplying water to the fan pump of a paper machine, a suction box pump adapted for conducting excess water from the paper machine, a conductor pipe connecting the suction box with the white water receiving tank, means for carrying away excess water from the suction box and the white water receiving tank, a pump operatively connected to one side of said means and discharging into said white water receiving tank, and a series of interconnected settling tanks operatively connected to another side of said means.

12. A settling system for recovering the ingredients contained in waste white water from paper making machines including a reservoir adapted to receive the waste white water, and means connected with the reservoir, one above the other for withdrawing the settlings and supernatant liquid from the reservoir.

13. A settling system for recovering the ingredients contained in waste white water from paper making machines including a reservoir adapted to receive the waste water at its bottom, pumps connected with the reservoir one above the other for withdrawing the settlings and supernatant liquid from the reservoir.

14. A settling system for recovering the ingredients contained in waste white water from paper making machines comprising a series of settling tanks, selectively controlled means for placing the tanks in communication with one another, means for conducting waste water to one of said tanks, and a pair of pumps one in communication with the first tank of the series and the other in communication with the last tank of the series for withdrawing the settlings and supernatant liquids respectively.

In testimony whereof I affix my signature.

CHARLES DUPUIS.